United States Patent [19]

Daguet

[11] Patent Number: 5,295,789
[45] Date of Patent: Mar. 22, 1994

[54] TURBOMACHINE FLOW-STRAIGHTENER BLADE

[75] Inventor: Alain P. M. Daguet, Bondoufle, France

[73] Assignee: Societe Nationale d'Etude et de Construction de Moteurs d'Aviation "SNECMA", Paris, France

[21] Appl. No.: 26,413

[22] Filed: Mar. 4, 1993

[30] Foreign Application Priority Data

Mar. 4, 1992 [FR] France ............... 92 02579

[51] Int. Cl.⁵ ........................... F01D 5/14
[52] U.S. Cl. ...................... 416/241 A; 415/200
[58] Field of Search .......... 416/229 R, 229 A, 241 A; 415/200

[56] References Cited

U.S. PATENT DOCUMENTS

| | | |
|---|---|---|
| 3,637,325 | 1/1972 | Morley ............... 416/241 A |
| 4,643,647 | 2/1987 | Perry ............... 416/241 A |
| 5,129,787 | 7/1992 | Violette et al. ........... 416/241 A |

FOREIGN PATENT DOCUMENTS

| | | |
|---|---|---|
| 448029 | 11/1942 | Belgium. |
| 0789671 | 8/1935 | France ............... 416/229 |
| 1577388 | 8/1969 | France. |

Primary Examiner—Edward K. Look
Assistant Examiner—Mark Sgantzos
Attorney, Agent, or Firm—Oblon, Spivak, McClelland, Maier & Neustadt

[57] ABSTRACT

The fixed blades of a flow-straightener in a turbomachine each includes a metallic structure having a smooth surface on one side defining one face of the blade and a grid having a plurality of cells on its opposite side which are filled with a composite material such as polyurethane, the filled cellular side of the metallic structure defining an opposite face of the blade.

9 Claims, 1 Drawing Sheet

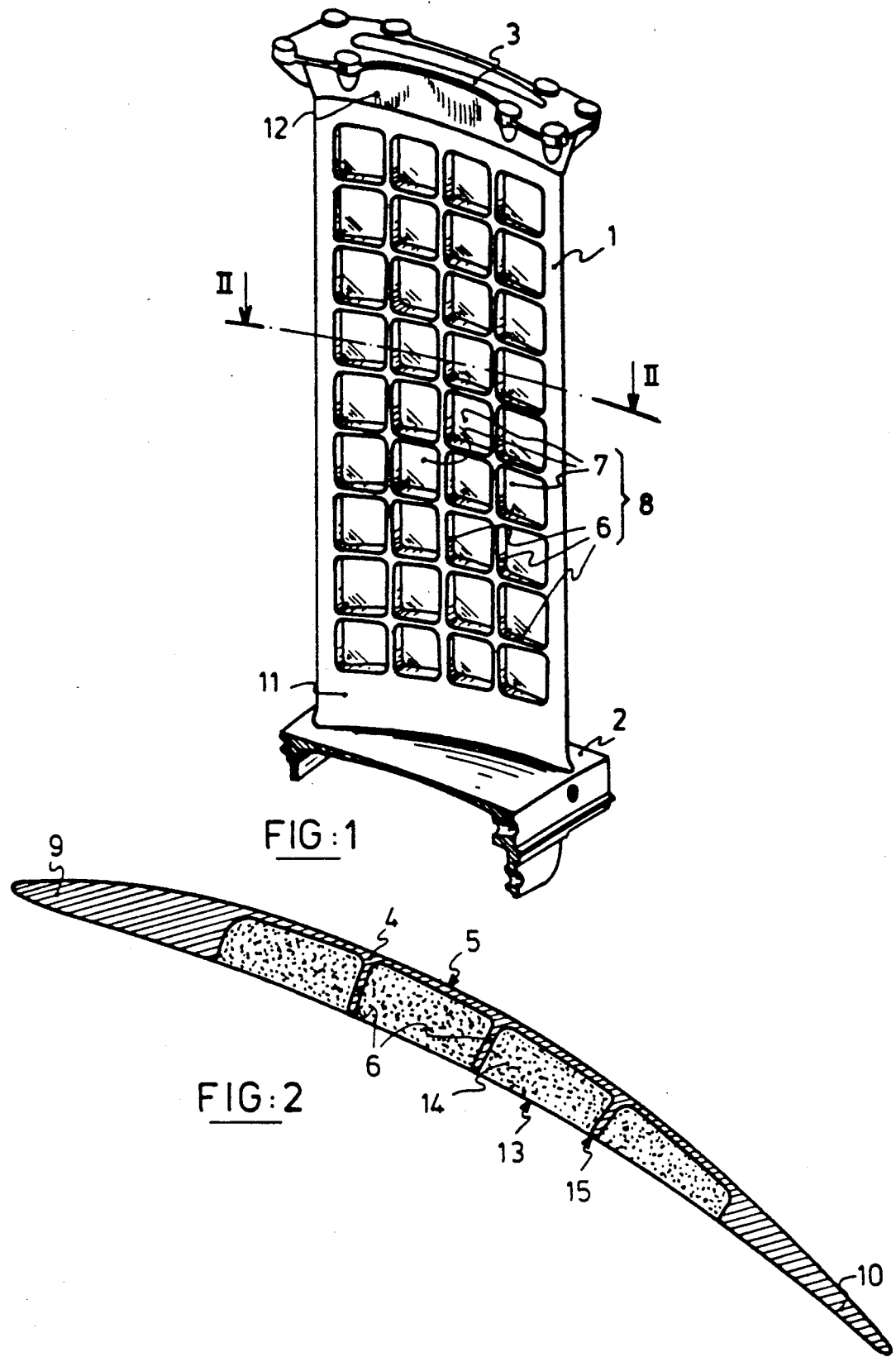
FIG:1
FIG:2

TURBOMACHINE FLOW-STRAIGHTENER BLADE

BACKGROUND OF THE INVENTION

1. Field of the Invention

The invention relates to flow-straighteners for turbomachines, especially flow-straighteners of the type having large-sized blades and intended for the fans of by-pass turbojet engines, and particularly relates to the construction of the blades of the flow-straightener.

2. Summary of the Prior Art

In order to achieve mass reductions and to meet operational conditions demanding good mechanical characteristics, anti-vibration properties and impact resistance, it is known to make hollow blades of large chord for the fan rotor of bypass turbojet engines, particularly in the high thrust engine class. Similar aims, particularly that of mass reduction, have also led to the use of hollow fixed blades in the construction of the fan flow-straightener. The techniques normally adopted for the manufacture of fan flow-straighteners involve the standard foundry practice of using cores for the hollow parts, particularly ceramic cores or soluble cores.

However, the application of these techniques to large hollow flow-straightener blades gives rise to numerous manufacturing difficulties and drawbacks, as well as to an increase in costs. For example, the use of soluble cores requires openings which have to be replugged by welding, which leads to deformations.

SUMMARY OF THE INVENTION

With the aim of providing a blade construction for a turbomachine flow-straightener having the required characteristics but without incurring the drawbacks of the known solutions mentioned above, according to the invention the blade comprises a metallic structure having a smooth surface on one side defining one face of the blade and a plurality of cells on its opposite side which are filled by a composite material, the filled cellular side of the metallic structure forming the other face of the blade.

The metallic structure of the blade may be formed by casting, by forging, of by machining, particularly electro-chemical machining, and the composite material is preferably of a polyurethane type.

BRIEF DESCRIPTION OF THE DRAWINGS

FIG. 1 is a diagrammatic perspective view showing one embodiment of a flow-straightener blade in accordance with the invention.

FIG. 2 shows, on a larger scale, a sectional view of the blade taken along line II—II in FIG. 1.

DESCRIPTION OF THE PREFERRED EMBODIMENT

As is known, a fan flow-straightener, particularly one placed in the secondary duct, termed the cold flow duct, of a bypass turbojet engine and intended to "straighten" the flow leaving the compression stage of the fan rotor in order to obtain the aerodynamic flow characteristics necessary to secure the desired thrust performance, is composed of a plurality of fixed blades which are arranged between the radially inner and outer walls of the duct defining the flow path and which are evenly spaced apart around the duct.

FIGS. 1 and 2 show one embodiment of a fan flow-straightener blade constructed according to the invention, the blade having an aerofoil shaped vane part 1 with the aerodynamic profile required for guiding the flow, the vane part 1 being rigidly connected at its lower or radially inner end to a ring portion 2 forming part of the inner wall of the secondary duct, and carrying a part 3 at its upper or radially outer end which cooperates with means, known per se and not shown in detail in the drawings, for fixing the blade to the fan casing.

As shown in FIGS. 1 and 2, the vane part 1 of the blade comprises a structure 4 having a smooth surface 5 on one side defining the aerodynamic profile of the extrados face of the blade, and a ribbed face on the opposite side, the ribs 6 defining adjoining cells 7 to form a cellular grid network 8 of intersecting ribs 6 such that a plurality of cells are formed both in substantially parallel rows from the leading edge to the trailing edge 10 and in substantially parallel columns from the radially inner end portion 11 to the radially outer end portion 12 of the vane part 1. The structure 4 has solid edge portions surrounding the cellular network 8 and forming the leading edge 9 and the trailing edge 10 of the blade and also the radially inner and outer end portions 11 and 12 respectively of the vane part 1. Between the solid edge portions of the structure 4, the intrados face 13 of the blade is completed by a composite material 14 filling the cells 7 and preferably flush with the free edges 15 of the ribs 6 but presenting an exposed outer surface. The structure 4 is metallic and the composite material may be of the polyurethane type.

A reverse arrangement may be adopted for the faces of the vane part 1, the smooth surface of the metallic structure being situated on the intrados side of the blade, and the cellular network filled with the composite material being situated on the extrados side.

The metallic structure 4 may be made by a conventional casting technique. However, depending on the applications envisaged and the means available, other methods of manufacture may be contemplated. Thus, the metallic structure 4 may also be made by forging or machining, especially electro-chemical machining.

I claim:

1. A flow-straightener blade for a turbomachine, comprising a metallic structure having opposite first and second sides, said metallic structure having a smooth surface on said first side defining one face of said blade and said second side forming a cellular network formed of a plurality of adjoining cells which includes a plurality of ribs extending from a tip portion to a root portion of the blade and from leading edge to a trailing edge of said blade, and a composite material which fills said cells, the filled second side of said metallic structure defining the other face of said blade.

2. A blade according to claim 1, wherein said one face is the extrados face of the blade.

3. A blade according to claim 1, wherein said one face is the intrados face of the blade.

4. A blade according to claim 1, wherein said metallic structure has solid edge portions defining the leading and trailing edges of the blade and the radially inner and outer end portions of the aerofoil part of the blade.

5. A blade according to claim 1, wherein said composite material comprises polyurethane.

6. A blade according to claim 1, wherein said metallic structure comprises a cast structure.

7. A blade according to claim 1, wherein said metallic structure comprises a forged structure.

8. A blade according to claim 1, wherein said metallic structure comprises an electrochemically machined structure.

9. A turbomachine flow straightener comprising:
an inner ring,
an outer casing, and
a plurality of fixed blades disposed between said inner ring and said outer casing and distributed evenly therearound, each of said blades comprising a metallic structure having opposite first and second sides, said metallic structure having a smooth surface on said first side defining one face of said blade and said second side forming a cellular network formed of a plurality of cells having a plurality of adjoining ribs extending from a tip portion to a root portion of the blade and from a leading edge to a trailing edge of said blade and a composite material which fills said cells, the filled second side of said metallic structure defining the other face of said blade.

* * * * *